US012579636B2

(12) United States Patent
Takahashi

(10) Patent No.: US 12,579,636 B2
(45) Date of Patent: Mar. 17, 2026

(54) IMAGE PROCESSING DEVICE, PRINTING SYSTEM, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Kosei Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 415 days.

(21) Appl. No.: 18/186,369

(22) Filed: Mar. 20, 2023

(65) Prior Publication Data

US 2023/0377126 A1     Nov. 23, 2023

(30) Foreign Application Priority Data

May 17, 2022    (JP) ................................. 2022-081072

(51) Int. Cl.
| | |
|---|---|
| *G06T 7/00* | (2017.01) |
| *G06V 10/25* | (2022.01) |
| *G06V 10/74* | (2022.01) |

(52) U.S. Cl.
CPC .............. *G06T 7/001* (2013.01); *G06V 10/25* (2022.01); *G06V 10/761* (2022.01); *G06T 2207/10024* (2013.01); *G06T 2207/30144* (2013.01)

(58) Field of Classification Search
CPC ........... G06T 7/001; G06T 2207/10024; G06T 2207/30144; G06V 10/25; G06V 10/761
See application file for complete search history.

(56) References Cited

U.S. PATENT DOCUMENTS

| | | | | |
|---|---|---|---|---|
| 7,391,473 | B2 | 6/2008 | Takahashi | |
| 7,426,319 | B2 | 9/2008 | Takahashi | |
| 9,007,655 | B2 * | 4/2015 | Iguchi .................. | H04N 1/4051 |
| | | | | 358/1.9 |
| 10,126,846 | B2 * | 11/2018 | Ainalem ................. | G06F 3/041 |
| 11,405,509 | B2 * | 8/2022 | Kikuta .............. | H04N 1/00034 |
| 11,562,481 | B2 * | 1/2023 | Takahashi .............. | G06T 7/001 |
| 11,665,303 | B2 * | 5/2023 | Nakada ............. | H04N 1/00037 |
| | | | | 358/3.26 |

(Continued)

FOREIGN PATENT DOCUMENTS

| | | |
|---|---|---|
| JP | H06-147855 A | 5/1994 |
| JP | 2005-205748 A | 8/2005 |

(Continued)

OTHER PUBLICATIONS

Jan. 23, 2026 Japanese Official Action in Japanese Patent Appln. No. 2022-081072.

*Primary Examiner* — Aaron W Carter

(74) *Attorney, Agent, or Firm* — Venable LLP

(57) ABSTRACT

There is provided with an image processing device. A correcting unit corrects a first difference between a density of a partial region in a print image obtained by scanning a printed matter to be inspected and a density of a region corresponding to the partial region in a reference image using a second difference between a density of a region including the partial region in the print image and a density of a region corresponding to the region including the partial region in the reference image. An inspecting unit inspects the print image based on the corrected first difference.

14 Claims, 10 Drawing Sheets

(56)         References Cited

U.S. PATENT DOCUMENTS

| | | | | |
|---|---|---|---|---|
| 11,968,332 | B2 * | 4/2024 | Kikuta | G06T 7/0002 |
| 2003/0234960 | A1 * | 12/2003 | Kaltenbach | G06K 5/02 |
| | | | | 358/3.26 |
| 2013/0114102 | A1 * | 5/2013 | Yamamoto | G06V 10/245 |
| | | | | 358/1.14 |
| 2013/0148863 | A1 * | 6/2013 | Muraishi | G06T 7/33 |
| | | | | 382/112 |
| 2013/0335753 | A1 * | 12/2013 | Okamoto | G06F 3/1285 |
| | | | | 358/1.2 |
| 2014/0268260 | A1 * | 9/2014 | Kitai | H04N 1/6027 |
| | | | | 358/521 |
| 2015/0269719 | A1 * | 9/2015 | Kitai | G06T 7/001 |
| | | | | 358/474 |
| 2020/0384777 | A1 * | 12/2020 | Mishima | B41J 2/36 |
| 2021/0266422 | A1 * | 8/2021 | Kikuta | H04N 1/00005 |
| 2021/0295488 | A1 * | 9/2021 | Watabe | G06T 7/001 |
| 2022/0067901 | A1 * | 3/2022 | Takahashi | G06K 15/027 |
| 2022/0311872 | A1 * | 9/2022 | Kikuta | H04N 1/6036 |
| 2023/0105377 | A1 * | 4/2023 | Takahashi | G06K 15/408 |
| | | | | 358/1.14 |
| 2023/0377126 | A1 * | 11/2023 | Takahashi | G06V 10/25 |
| 2024/0070847 | A1 * | 2/2024 | Mochizuki | G06T 7/001 |
| 2024/0364820 | A1 * | 10/2024 | Kitai | H04N 1/00029 |

FOREIGN PATENT DOCUMENTS

| | | | |
|---|---|---|---|
| JP | 2015-178970 | A | 10/2015 |
| JP | 2021-135145 | A | 9/2021 |
| JP | 2021-149305 | A | 9/2021 |
| WO | 2014/129072 | A1 | 8/2014 |

* cited by examiner

F I G. 5
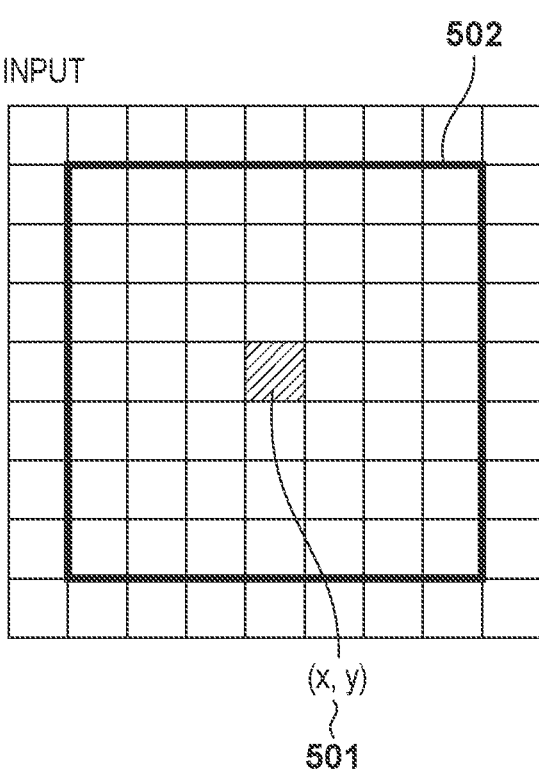
INPUT
502
(x, y)
501
F I G. 6
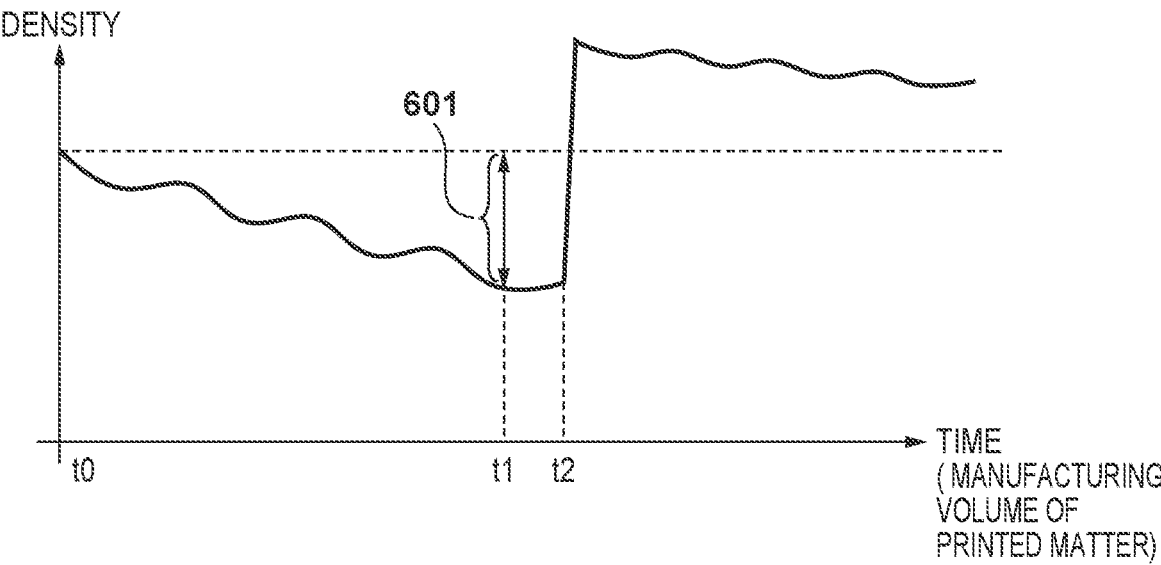
DENSITY
601
t0          t1  t2          TIME
                            (MANUFACTURING
                            VOLUME OF
                            PRINTED MATTER)

F I G. 7A
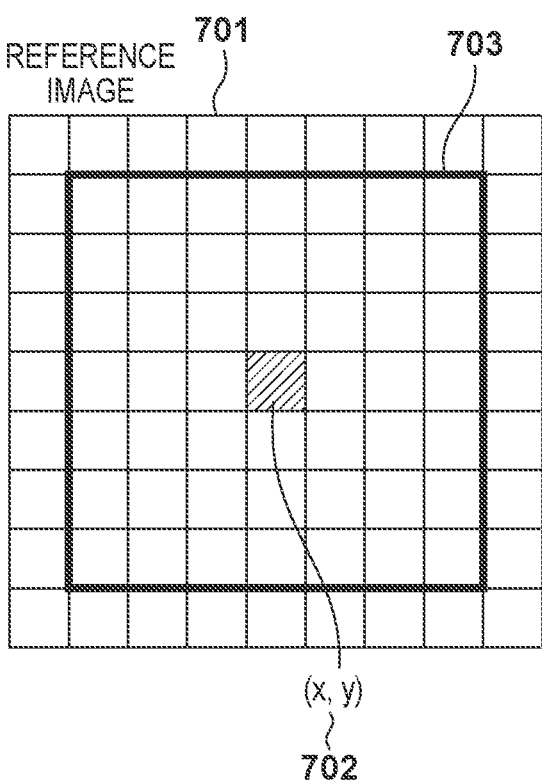
REFERENCE IMAGE
701
703
(x, y)
702
F I G. 7B
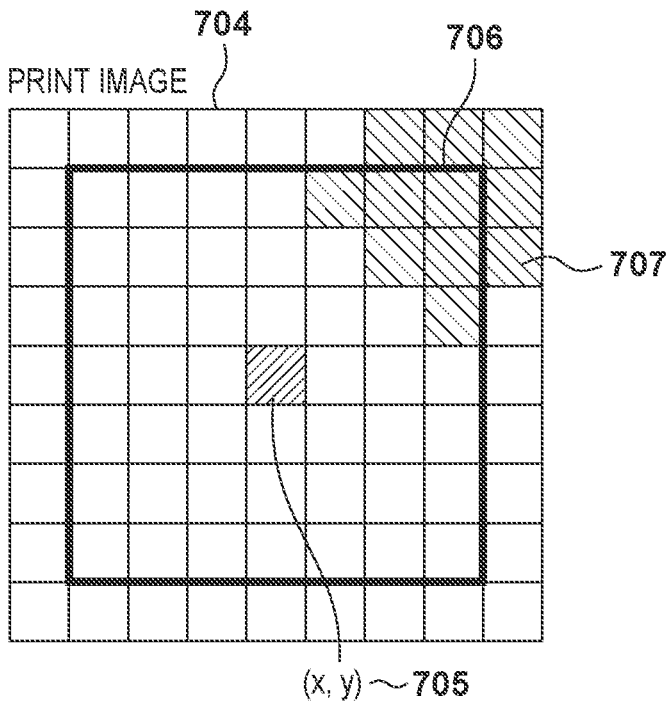
PRINT IMAGE
704
706
707
(x, y) ~ 705

1

IMAGE PROCESSING DEVICE, PRINTING SYSTEM, IMAGE PROCESSING METHOD, AND NON-TRANSITORY COMPUTER-READABLE STORAGE MEDIUM

BACKGROUND OF THE INVENTION

Field of the Invention

The present invention relates to an image processing device, a printing system, an image processing method, and a non-transitory computer-readable storage medium.

Description of the Related Art

In the past, inspection using image processing is performed in order to check the quality of a printed matter. There is a technique for automatically inspecting a printed matter by comparing a reference image of a printed matter that is a non-defective product (satisfies an inspection standard) with print image data of a printed matter to be inspected. Even when printing a printed matter from the same input data, the electrophotographic printing apparatus may print printed matters having different densities or colors depending on the state of the printing apparatus (e.g., the toner remaining amount).

In view of the above problems, a technique has been proposed in which, when a printing apparatus is calibrated, a printed matter is inspected by comparing a master image generated for inspecting a defect of a print image with the print image (Japanese Patent Laid-Open No. 2015-178970).

SUMMARY OF THE INVENTION

According to the present invention, an image processing device that improves inspection accuracy with respect to a printed matter even in a case where print density changes with time can be provided.

The present invention in its one aspect provides an image processing device comprising at least one processor, and at least one memory coupled to the at least one processor, the memory storing instructions that, when executed by the processor, cause the processor to act as a correcting unit configured to correct a first difference between a density of a partial region in a print image obtained by scanning a printed matter to be inspected and a density of a region corresponding to the partial region in a reference image using a second difference between a density of a region including the partial region in the print image and a density of a region corresponding to the region including the partial region in the reference image, and an inspecting unit configured to inspect the print image based on the corrected first difference.

The present invention in its one aspect provides an image processing method comprising correcting a first difference between a density of a partial region in a print image obtained by scanning a printed matter to be inspected and a density of a region corresponding to the partial region in a reference image using a second difference between a density of a region including the partial region in the print image and a density of a region corresponding to the region including the partial region in the reference image, and inspecting the print image based on the corrected first difference.

The present invention in its one aspect provides a non-transitory computer-readable storage medium storing instructions that, when executed by a computer, cause the computer to perform an image processing method comprising correcting a first difference between a density of a partial region in a print image obtained by scanning a printed matter to be inspected and a density of a region corresponding to the partial region in a reference image using a second difference between a density of a region including the partial region in the print image and a density of a region corresponding to the region including the partial region in the reference image, and inspecting the print image based on the corrected first difference.

Further features of the present invention will become apparent from the following description of exemplary embodiments (with reference to the attached drawings).

BRIEF DESCRIPTION OF THE DRAWINGS

FIG. 5 is a diagram explaining a relationship between a pixel of interest and a peripheral region according to the first embodiment.

FIG. 6 is a diagram illustrating an example of a change in print density over time occurring in a print image according to the first embodiment.

FIG. 7A is a diagram illustrating a reference image according to the first embodiment.

FIG. 7B is a diagram illustrating a print image according to the first embodiment.

DESCRIPTION OF THE EMBODIMENTS

Figure 1:
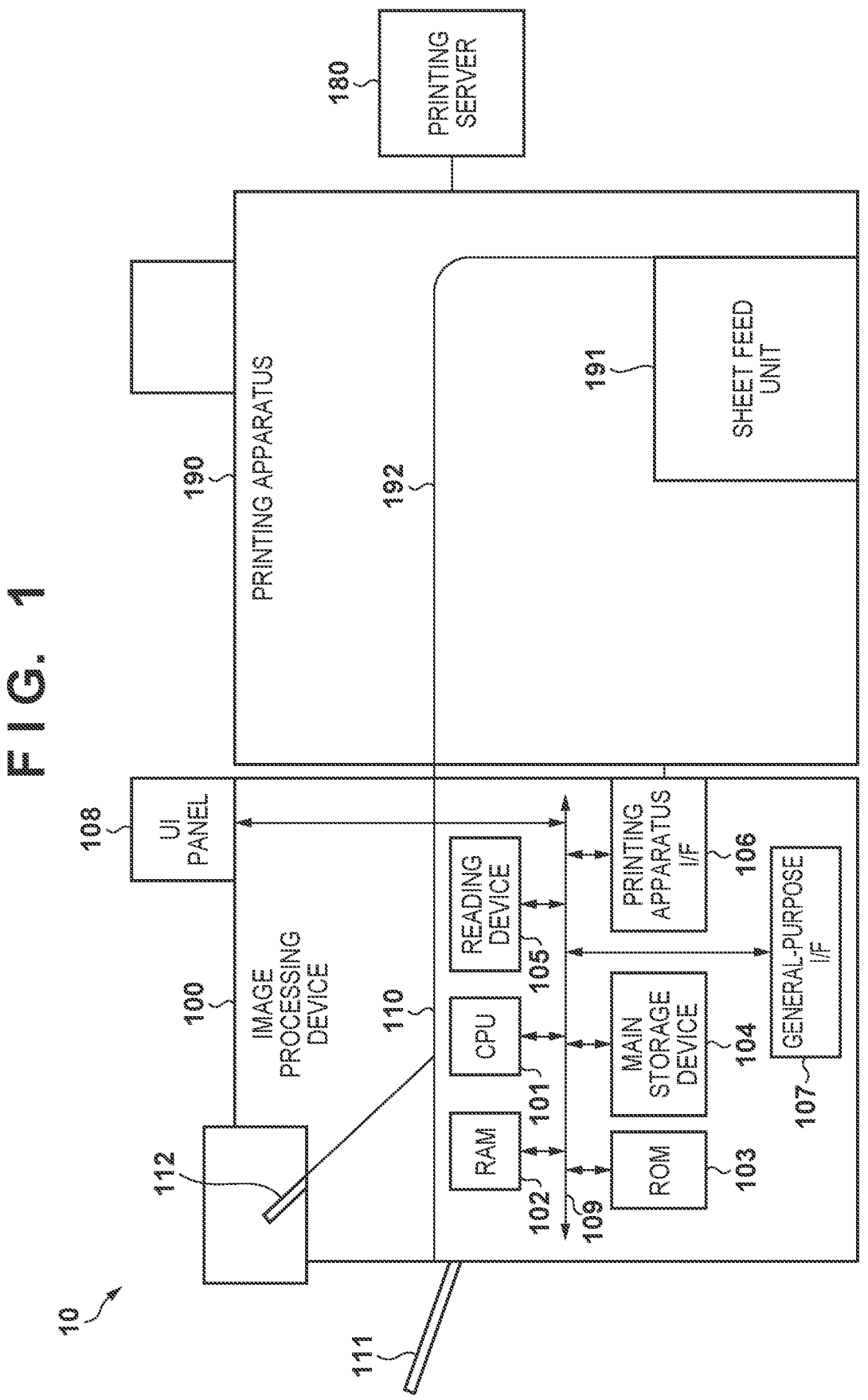
FIG. 1 is a diagram illustrating an example of hardware configuration of a printing system according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An image processing device obtains a first difference between the density of the partial region in the print image obtained by scanning the printed matter to be inspected and the density of the region corresponding to the partial region in the reference image obtained by scanning the printed matter serving as the inspection standard. The image processing device corrects the first difference using a second difference between a density of a region including the partial region in the print image and a density of a region corresponding to the region including the partial region in the reference image. The image processing device determines whether or not a defective area is included in the print image based on the corrected first difference.

The image processing device evaluates the quality of a printed matter to be inspected by comparing pixel values of a reference image indicating a target of print output and a print image. Therefore, the image processing device corrects the pixel value of the reference image based on the global density difference between the reference image and the print image. The global density difference refers to a density difference with respect to a reference image of an arbitrary toner color uniformly generated over the entire print image according to elapse of time.

For example, the image processing device corrects the pixel value of the reference image by using an average pixel value of the local region of each of the reference image and the print image. The image processing device determines whether or not a defective area is included in the print image based on difference data between the corrected pixel value of the reference image and the pixel value of the print image. As a result, the image processing device can inspect the printed matter with high accuracy while reducing the influence of the global density difference caused by the temporal change in the print density.

However, the image processing device determines that the printed matter does not satisfy the inspection standard since the color shift occurs in the print image when the global density difference becomes too large. Therefore, the image processing device does not correct the pixel value of the reference image with a global density difference exceeding a threshold value defined in advance.

Here, FIG. 6 is a diagram illustrating an example of a change in print density over time occurring in a print image according to the first embodiment. The horizontal axis represents time, and the vertical axis represents print density in the print image.

As illustrated in FIG. 6, the global density difference refers to a density difference with respect to a reference image of an arbitrary toner color uniformly generated over the entire print image according to elapse of time. The electrophotographic printing apparatus 190 may print printed matters having different densities or colors even with the same input data depending on the situation of the printing apparatus 190 (e.g., the toner remaining amount). In FIG. 6, the print density decreases from time t0 to time t1. On the other hand, toner is supplied to the printing apparatus at time t2 and the print density is increased.

FIG. 1 is a diagram illustrating an example of a hardware configuration of a printing system according to a first embodiment.

The printing system 10 includes an image processing device 100, a printing server 180, and a printing apparatus 190.

The printing server 180 generates a print job and inputs the print job to the printing apparatus 190.

The printing apparatus 190 is a device that forms an image on a recording medium, and is, for example, an electrophotographic copier and a printer. The printing apparatus 190 forms an image on a recording medium supplied from a sheet feed unit 191 based on a print job. The recording medium is paper (e.g., printing paper), but is not limited thereto. The user sets printing paper in the sheet feed unit 191 of the printing apparatus 190 in advance. When a print job is input, the printing apparatus 190 forms an image on the front surface or both surfaces of the printing paper, and conveys the printing paper to the image processing device 100 along the conveyance path 192.

The image processing device 100 includes a CPU 101, a RAM 102, a ROM 103, a main storage device 104, a reading device 105, a printing apparatus I/F 106, a general-purpose I/F 107, an UI panel 108, and a main bus 109. In addition, the image processing device 100 includes a conveyance path 110 of the printed matter connected to the conveyance path 192, an output tray 111 of the printed matter that has passed the inspection, and an output tray 112 of the printed matter that has failed the inspection.

The image processing device 100 inspects a sheet (i.e., printed matter) conveyed via the conveyance path 192 and the conveyance path 110 based on the reference image. The image processing device 100 conveys the printed matter to an output tray according to the inspection result of the printed matter.

The CPU 101 is a processor that integrally controls each unit included in the image processing device 100.

The RAM 102 functions as a main memory and a work area for the CPU 101.

The ROM 103 stores a program executed by the CPU 101.

The main storage device 104 stores an application executed by the CPU 101 and data used for image processing.

The reading device 105 is a device that reads printed matter, and is, for example, a scanner. The reading device 105 acquires a reference image or a print image by reading one side or both sides of the printed matter sent from the printing apparatus on the conveyance path 110.

The printing apparatus I/F 106 is connected to the printing apparatus 190. The printing apparatus I/F 106 acquires the operation information of the printing apparatus 190 by synchronizing the processing timing of the printed matter with that of the printing apparatus 190.

The general-purpose I/F 107 is a serial bus interface such as USB or IEEE 1394, and is used, for example, by a user to extract log data.

The UI panel 108 is a user interface screen for displaying various types of data and is, for example, a liquid crystal display. The UI panel 108 displays the status and settings of the image processing device 100 on a screen. The UI panel 108 includes a touch panel and an input button for receiving an instruction from a user.

The main bus 109 connects each unit of the image processing device 100. Accordingly, the CPU 101 can control each unit of the image processing device 100 or the printing system 10. For example, the CPU 101 performs control to synchronize each conveyance path, and conveys the printed matter to the outputting tray 111 or the outputting tray 112 according to the inspection result of the printed matter.

Figure 2:
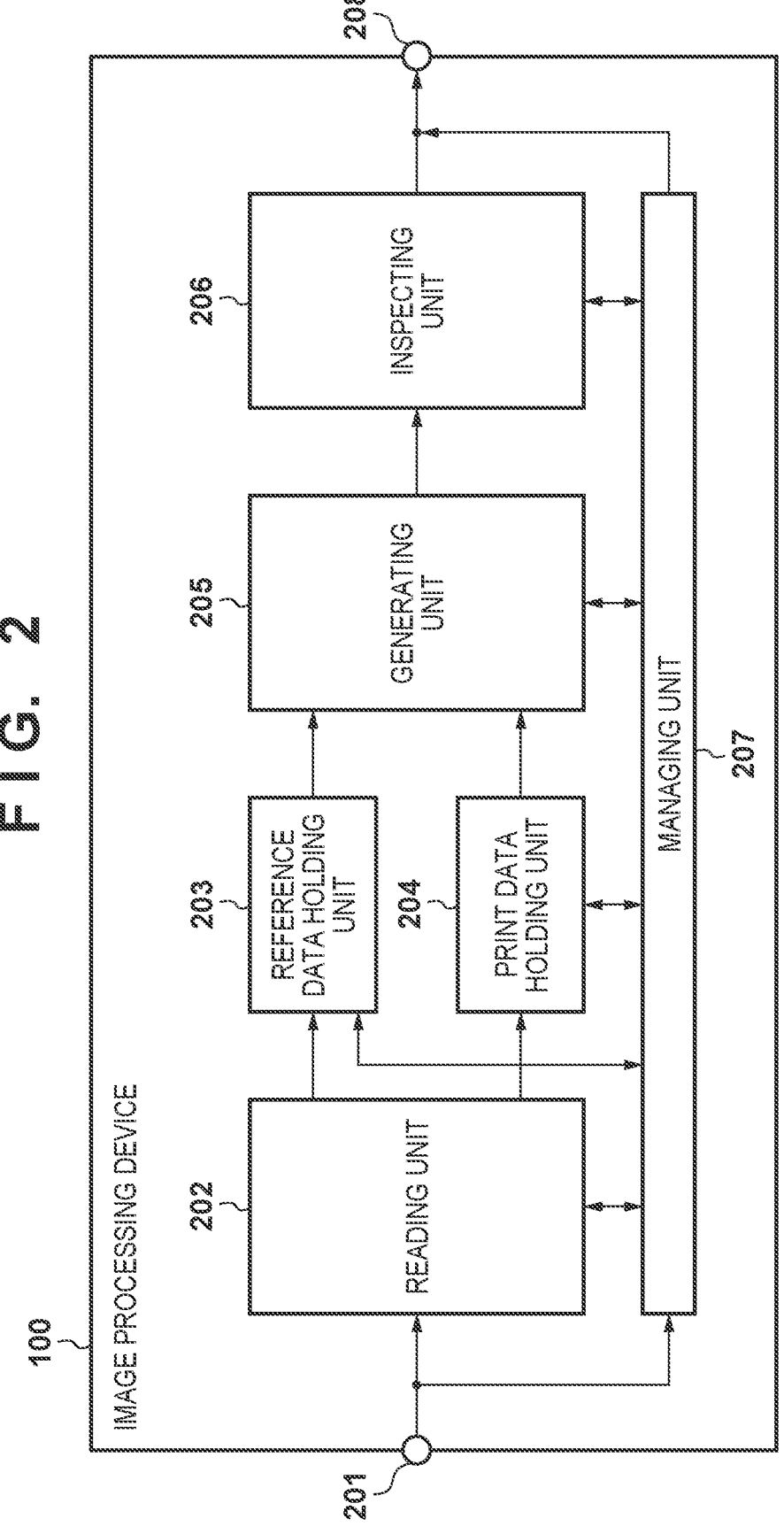
FIG. 2 is a diagram illustrating an example of a functional configuration of an image processing device according to the first embodiment.

FIG. 2 is a diagram illustrating an example of a functional configuration of the image processing device according to the first embodiment.

The image processing device 100 includes an input terminal 201, a reading unit 202, a reference data holding unit 203, a print data holding unit 204, a generating unit 205, an inspecting unit 206, a managing unit 207, and an output terminal 208.

The input terminal 201 receives a control signal that is input in synchronization with output of a printed matter from the printing apparatus 190 or as necessary.

When a control signal is input to the input terminal 201, the reading unit 202 acquires an image of a printed matter on the conveyance path 110. The image read by the reading device 105 is distinguished to a reference image or a print image.

The reference data holding unit 203 stores a reference image.

The print data holding unit 204 stores a print image.

The generating unit 205 generates the difference data based on the density (pixel value) of the region (pixel) in the print image and the density (pixel value) of the region (pixel) corresponding to the region of the print image in the reference image. The difference data corresponds to first difference data.

The inspecting unit 206 determines whether or not a defective area is included in the print image based on the difference data. Next, the inspecting unit 206 outputs a control signal to the internal driving unit of the printing system 10 through the output terminal 208 based on the determination result of the print image.

The managing unit 207 exchanges information with each unit of the image processing device 100. The managing unit 207 collects information on the number of images currently being processed and the presence or absence of an error. The managing unit 207 outputs the collected information as a log as necessary and outputs a control signal to the printing system 10.

The output terminal 208 outputs a control signal for operating the printing system 10 based on the inspection result of the printed matter by the inspecting unit 206.

Figure 3:
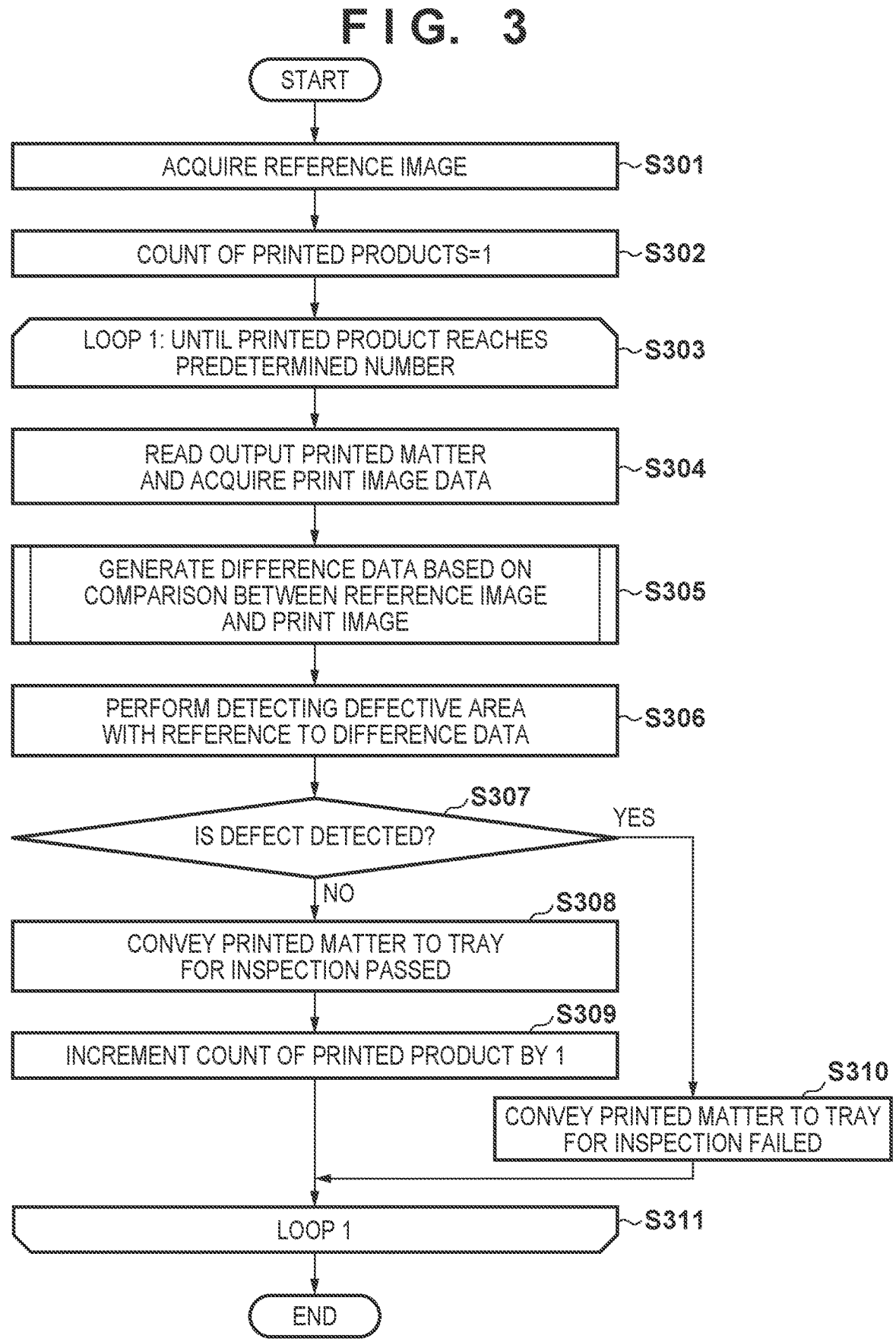
FIG. 3 is a flowchart explaining an example of image processing according to the first embodiment.

FIG. 3 is a flowchart explaining a flow of the image processing according to the first embodiment. The CPU 101 reads a program along the flowchart illustrated in FIG. 3 from the ROM 103 and executes the program.

In S301, the image processing device 100 acquires the reference image from the reference data holding unit 203. Hereinafter, the reference image will be described. First, the user prints a predetermined number of printed matters using the printing apparatus 190. The user selects a printed matter having no defect (satisfying the inspection standard) from among the printed matters. Next, the reading unit 202 acquires a reference image by reading the selected printed matter. The reference data holding unit 203 stores the reference image. The reference image is represented in a RGB 8 bit format (represented by a three dimensional vector array having each channel of RGB as elements). The user needs to perform visual inspection on the printed matter to acquire the reference image. Since the image processing device 100 inspects the printed matter in the processing after the S301, the user does not need to visually inspect the printed matter.

In S302, the managing unit 207 sets a count indicating the number of printed matters that have passed the inspection (count of printed products) to 1. The count is used until the number of printed matters that have passed the inspection reaches a predetermined number in a processing loop after S303 described later.

In the processes from S303 to S311, the image processing device 100 distinguishes the printed matter printed by the printing apparatus 190 into the printed matter that has passed or failed the inspection. Here, the image processing device 100 repeats the processing from S303 to S311 on the printed matters printed by the printing apparatus 190 until the number of printed matters that have passed the inspection reaches a predetermined number.

In S304, the reading unit 202 acquires a print image by reading the printed matter printed by the printing apparatus

190. The print data holding unit 204 stores a print image. Like the reference image, the print image is represented in the RGB 8 bit format.

In S305, the generating unit 205 generates the difference data D based on the difference between the density of the partial region of the reference image and the density of the partial region of the print image corresponding to the partial region of the reference image. The difference data D will be described below. First, the generating unit 205 corrects the pixel value of the region of the reference image based on the global density difference between the reference image and the print image. Next, the generating unit 205 acquires the difference data D based on the difference between the corrected pixel value of the region of the reference image and the region of the print image. Here, the difference data D is an image having the same size as the reference image and the print image.

In S306, the inspecting unit 206 performs a process of detecting a defective area of the print image based on the difference data D. The difference data D stores, for each pixel, a value indicating a difference between the density of the region of the reference image after correction and the density of the region of the print image. Therefore, in a case where there is a pixel (region) satisfying a predetermined condition in the difference data D, the inspecting unit 206 detects the region as a region (defective area) indicating a defect of the printed matter.

The defective area of the printed matter is, for example, a region in which an area of a region including a pixel, whose difference value exceeds a threshold value, exceeds a predetermined area, or a region forming a shape such as a streak. The inspecting unit 206 detects the defective area of the print image by filtering the difference data D or calculating the sum of the pixel values of the row or column corresponding to the streak direction.

When detecting the defective area of the print image based on the difference data D, the inspecting unit 206 determines that the printed matter has failed. On the other hand, when the pixel value in the difference data D is 0 or a sufficiently small value (i.e., in a case where there is no difference in pixel value between the region of the reference image and the region of the print image), the inspecting unit 206 determines that the printed matter has passed.

In S307, the inspecting unit 206 determines the inspection result on the printed matter based on whether or not the defective area of the print image is detected based on the difference data D. When the defective area of the print image is not detected (No in S307), the inspecting unit 206 determines that the printed matter has passed, and the process proceeds to S308. When the defective area of the print image is detected (Yes in S307), the inspecting unit 206 determines that the printed matter has failed, and the process proceeds to S310.

In S308, the inspecting unit 206 outputs a control signal to the printing system 10 so as to convey the printed matter to the output tray 111.

In S309, the managing unit 207 increments the count of the printed product by one, and the process proceeds to S311. The printed product refers to a printed matter that has passed the inspection.

In S310, the inspecting unit 206 outputs a control signal to the printing system 10 to convey the printed matter to the output tray 112, and the process proceeds to S311. Note that the image processing device 100 includes a plurality of output trays 112 according to the extent of the defective area of the print image. The image processing device 100 conveys the printed matter determined to have failed based on the extent of the defective area of the print image to the respective output tray 112. The extent of the defective area of the print image is, for example, the size and the number of defective areas.

In S311, the inspecting unit 206 determines whether or not the count of the printed products has reached a predetermined number. When determined that the count of the printed products has reached the predetermined number, the inspecting unit 206 ends the process. When determined that the count of the printed products has not reached the predetermined number, the inspecting unit 206 returns the process to S303.

Figure 4:
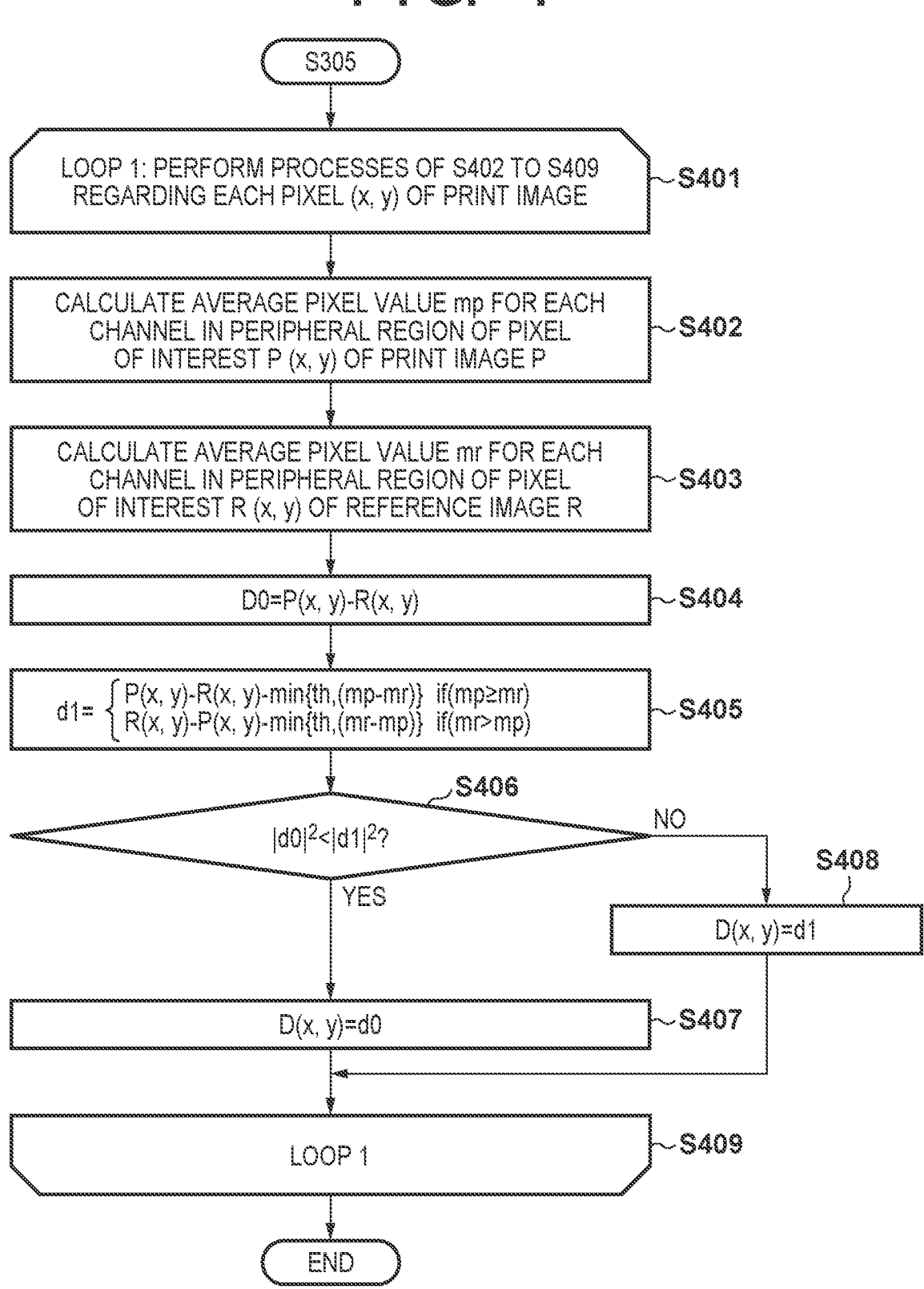
FIG. 4 is a flowchart for explaining generation process of difference data according to the first embodiment.

FIG. 4 is a flowchart for explaining generation process of difference data according to the first embodiment.

The print image P and the reference image R are images of the same size and do not have positional deviation and rotational deviation at the time of scanning. The position of the pixel P (x, y) of the print image P corresponds to the position of the pixel R (x, y) of the reference image R.

In S401, the generating unit 205 sets the pixel P (x, y) of the print image P as the pixel of interest, and repeats the processes of S401 to S409.

In S402, the generating unit 205 calculates an average pixel value mp for each channel of RGB in a peripheral region (neighborhood region) of the pixel of interest P (x, y). Here, mp is a three-dimensional vector. Each pixel corresponds to each channel of RGB.

Here, FIG. 5 is a diagram for explaining a relationship between a pixel of interest and a peripheral region.

In FIG. 5, a pixel 501 is a pixel of interest P (x, y). The region 502 is a 7×7 region centered on the pixel 501, and is a region (average value acquiring region) for acquiring the average pixel value mp. Note that the average value acquiring region has a size 7×7, but may be a region of a predetermined size. Furthermore, in the present embodiment, the average pixel value is used, but the present invention is not limited thereto, and a median pixel value, a mode pixel value, and the like may be used.

In S403, similarly to the process of S402, the generating unit 205 calculates the average pixel value mr for each channel of RGB in the peripheral region of the pixel of interest R (x, y) of the reference image R. Like mp, mr is a three-dimensional vector corresponding to each channel of RGB.

In S404, the generating unit 205 calculates d0 to be a candidate of the pixel value in the pixel (x, y) of the difference data D according to the following (Formula 1). d0 is a difference in pixel values at the same position in the print image and the reference image. Furthermore, d0 is a three dimensional vector corresponding to each channel of RGB.

$$d0 = P(x, y) - R(x, y) \quad \text{(Formula 1)}$$

In S405, the generating unit 205 calculates d1 to be a candidate of a pixel value different from d0 in the pixel (x, y) of the difference data D according to the following Formula (2). d1 is a difference between the pixel value of the region of the reference image corrected by the difference (mp−mr) between the average pixel value mp of the print image P and the average pixel value mr of the reference image R, and the pixel value of the region of the print image. That is, the average pixel value mp of the peripheral region of the pixel of interest P (x, y) matches the average pixel value expressed by R (x, y)+(mp−mr). Therefore, it is possible to take a difference while canceling out the global density difference between the print image P and the reference image R. d1 is a three dimensional vector corresponding to each channel of RGB, similarly to d0. In addition, d1 includes, for example, a statistical value of at least one of a least square error of RGB values, a difference in brightness values, and a color difference in Lab values.

$$d1 = \begin{cases} P(x, y) - R(x, y) - \min\{th, (mp - mr)\} & \text{if } (mp \geq mr) \quad \text{(Formula 2)} \\ R(x, y) - P(x, y) - \min\{th, (mr - mp)\} & \text{if } (mr \geq mp) \end{cases}$$

Here, th is a predetermined threshold value. In a case where the absolute value of the difference (mp−mr) in the average pixel values (average densities) is smaller than the threshold value (mp−mr<th), the variation corresponding to the average density is corrected. In a case where the absolute value of the difference in average density (mp−mr) is larger than the threshold value (mp−mr>th), correction is performed not by the difference in average density but by the threshold value, and thus the value of d1 increases.

In S406, the generating unit 205 calculates the square norm of d0 and d1, and determines which of the square norm of d0 and d1 is smaller. When the generating unit 205 determines that the square norm of do is smaller than the square norm of d1 (Yes in S406), the process proceeds to S407. When the generating unit 205 determines that the square norm of do is not smaller than the square norm of d1 (No in S406), the process proceeds to S408.

In S407, the generating unit 205 determines the square norm of d0 as the value of the pixel (x, y) of the difference data D, and the process proceeds to S409.

In S408, the generating unit 205 determines the square norm of d1 as the value of the pixel (x, y) of the difference data D, and the process proceeds to S409.

In S409, the generating unit 205 determines whether or not the processes of S401 to S08 have been performed for all the pixel positions of the print image P and the reference image R. When the generating unit 205 determines that the processes have been executed for all the pixel positions, the process ends. When the generating unit 205 determines that the processes have not been executed for all the pixel positions, the process returns to S401.

Since all the pixel values of the difference data D are determined by executing the processes of S401 to S409 on all the pixel positions of the print image P and the reference image R, the difference data D (difference image) is obtained. The difference data D has the same size and the same number of channels as the print image P and the reference image R. The pixel (x, y) of the difference data D corresponds to the position of the pixel (x, y) of each of the print image P and the reference image R.

The generating unit 205 corrects the image value of the reference image R based on the global density difference between the reference image R and the print image P. Then, the generating unit 205 generates the difference data D based on the difference in the corrected image values of the reference image R and the print image P. The reason for correcting the density of the region of the reference image R will be described below.

Referring to FIG. 6 again, the print density decreases between time t0 at which the printing apparatus 190 started printing the printed matter and time t2. On the other hand, since the toner is supplied to the printing apparatus 190 after time t2, the print density increases. In general, variations in print density occur over the entire print image.

When the magnitude of the variation in the print density in the print image caused by the output characteristics of the printing apparatus 190 is excessively large, the user visually recognizes the variation in the print density of the printed matter. That is, such a printed matter has a region of printing failure (defect). However, unlike a case where there is a difference in print density only in a local region of the print image, when the density difference between the reference image and the print image uniformly occurs over the entire print image, the visual density difference becomes inconspicuous. In this case, the density difference occurring in the print image may be allowed.

Inspection of the printed matter is performed to ensure that the printed matter has a consistent quality. However, when the inspection standard for printed matter is made strict, printed matter that fails increases. This can adversely affect the productivity, delivery date and cost of the printed matter. Therefore, the inspection standard of the printed matter is appropriately set according to the quality required by the user.

Hereinafter, the density difference that is visually inconspicuous in the print image will be described. Even if the printing apparatus 190 prints the printed matter at time t1 in FIG. 6 based on the same input data as at time t0, the print density shifts by the width 601. The difference in print density (width 601) appears as a difference in pixel values in the difference data D generated by the generating unit 205.

When the defective area of the print image is detected based on the difference data D in S306, decrease in the inspection accuracy of the printed matter and erroneous detection of the defective area may occur by using d0 (by performing the inspection without considering the allowable density difference). Therefore, in order to generate the difference data D in consideration of the uniform density difference occurring over the entire print image, the inspecting unit 206 corrects the density of the region of the reference image based on the distribution of the pixel values in the local region of the print image. That is, in a case where $mp \geq mr$ and $th \geq mp-mr$, the inspecting unit 206 corrects $d1 = P(x, y) - R(x, y) - (mp-mr)$. d1 is a difference obtained by subtracting a difference $(mp-mr)$ of the average pixel value from a difference between the density of the region of the reference image and the density of the region of the print image. Furthermore, it is also possible to interpret that the difference is calculated after the average pixel values of the print image P and the reference image R are matched based on $d1 = (P(x, y) - mp) - (R(x, y) - mr)$. By calculating d1 and removing the allowable density difference from the difference data D, the inspecting unit 206 can inspect the printed matter while reducing the influence of the global density difference.

However, if the global density difference is too large, a printed matter having a color significantly different from that of the printed matter satisfying the inspection standard passes the inspection, and thus the global density difference may not be acceptable. Therefore, color variation greater than or equal to a certain value is not allowed by providing a threshold value for the correction amount of the density variation according to the term of min $\{th, (mp-mr)\}$.

FIG. 7A is a diagram illustrating a reference image according to the first embodiment. FIG. 7B is a diagram illustrating a print image according to the first embodiment.

The pixel of interest 702 and the average value acquiring region 703 exist in the reference image 701. In the print image 704, there are a pixel of interest 705 and an average value acquiring region 706.

The print image 704 has a defective area 707 (shaded portion) having a pixel value significantly different from that of the reference image 701. Here, the pixel value of the pixel of interest in the region of the print image 704 excluding the defective area 707 is the same as the pixel value of the pixel of interest in the reference image 701. That is, since the pixel values of the pixel of interest 702 and the pixel of interest 705 are the same, d0 is 0 at the pixel of interest (x, y) of the difference data D. However, mr and mp used for calculating d1 have different values from each other due to the influence of the defective area 707 existing in the average value acquiring region 706.

That is, the calculation formula of d1 means that the pixel value is adjusted so as to cancel the difference between mr and mp. Therefore, although there is no difference in pixel value between the region other than the defective area 707 of the print image 704 and the region of the reference image 701, the difference of the defective area 707 is included in the difference between the pixel of interest 702 and the pixel of interest 705.

When d1 is used in the peripheral portion of the region where the defective area 707 and the average value acquiring region 706 overlap, an image value is recorded in the pixel of interest D (x, y) as if the defective area 707 has blurred and spread in the difference data D.

Therefore, when generating the difference data D, the generating unit 205 adopts a smaller difference between the square norm of d1 and the square norm of d0 as the pixel value of the region indicated by the difference data D for each pixel. As a result, the influence of the global density difference that is visually inconspicuous is reduced by the adjustment of the average pixel value, and the pixel value of the defective area 707 is prevented from being included in the density of the region indicated by the difference data D. Therefore, since the generation accuracy of the difference data D improves, the inspection accuracy and productivity of the printed matter improve.

In addition, although the generating unit 205 generates the difference data based on the density of the region of the reference image and the density of the region of the print image, this is not the sole case. The generating unit 205 may generate partial difference data based on the density of the region of some reference images and the density of the region of some print images. The inspecting unit 206 may inspect the print image based on the partial difference data.

Furthermore, in the image processing device 100, every time the inspection process is performed on the new print image, the generating unit 205 may calculate mr in S403, and may reuse mr used in the past process. For example, in a case where the reference image is not changed in a certain period after the reference image is created, the reference data holding unit 203 stores mr calculated from the reference image used in the past process. The generating unit 205 reads the stored mr when each print image is processed.

The print image P and the reference image R are images of the same size and do not have positional deviation and rotational deviation at the time of scanning. However, in practice, positional deviation and rotational deviation may occur in the print image P at the time of scanning the printed matter. Therefore, the image processing device 100 performs correction on the print image in consideration of positional deviation and rotational deviation at the time of scanning.

For example, the image processing device 100 performs a feature point extraction process on the reference image and the print image at a time point (between S304 and S305) when the print image is acquired, and acquires corresponding points (coordinates) in both images. Next, the image processing device 100 corrects the positional deviation at the time of scanning using a conversion equation (e.g., affine transformation) that matches the feature points of both images. The feature point extraction process is, for example, SIFT, SURF, ORB, or AKAZE.

Furthermore, in S404, the generating unit 205 may obtain not only the difference between the pixel of interest P (x, y) and the pixel of interest R (x, y) of the reference image, but also the difference between the pixel of interest P (x, y) and the pixel in the region around the pixel of interest R (x, y). In this case, the generating unit 205 may select a pixel having the smallest difference with the pixel of interest P (x, y) from the region around the pixel of interest R (x, y), and acquire the difference with the selected pixel as d0. That is, the generating unit 205 may obtain the feature point of the peripheral region of the pixel of interest R (x, y) in which the density difference from the pixel of interest P (x, y) is minimized among the peripheral regions of the pixel of interest R (x, y) as the corresponding point (coordinate) between the images.

Furthermore, since the change in pixel value is large at the edge portions of the reference image R and the print image P, even a slight deviation (e.g., about one pixel) having a small visual influence is recorded as a large difference in the region indicated by the difference data D. Therefore, in the process of S407 or S408 for determining the pixel (x, y) of the difference data D, the generating unit 205 may correct the density (pixel value) of the region indicated by the difference data by multiplying d0 or d1 by a weight coefficient in consideration of the edge portions of both images.

Specifically, the edge components of the reference image R and the print image P are obtained in advance by the edge extraction filter. Then, in the edge region, a value of the pixel (x, y) of the difference data D may be determined by multiplying d0 or d1 by a weight coefficient that reduces the difference. Note that the weight coefficient may be a coefficient corresponding to an edge component. In addition, the weight coefficient may be a weight coefficient that reduces the pixel value of the difference data D in a high-frequency region by obtaining frequency characteristics for each region of the reference image R and the print image P. Thus, a large difference value can be suppressed from being counted in the region (pixel) of the difference data D.

Second Embodiment

In a second embodiment, a global density difference between a reference image and a print image is detected, and the reference image is updated (replaced) with the print image based on the detected density difference. The second embodiment will be described, focusing on the difference from the first embodiment.

Figure 8:
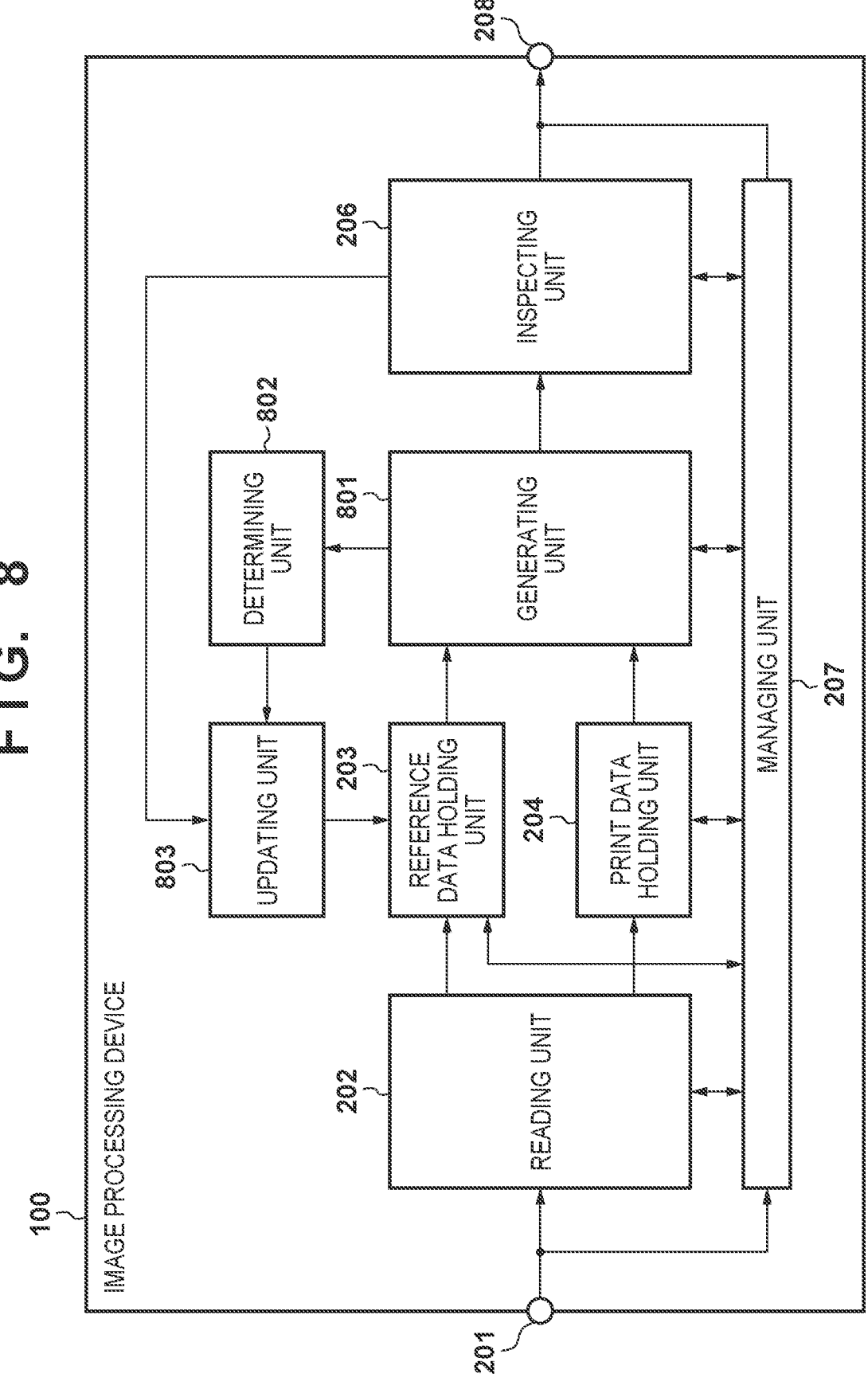
FIG. 8 is a diagram illustrating an example of a functional configuration of an image processing device according to a second embodiment.

FIG. 8 is a diagram illustrating an example of a functional configuration of the image processing device according to the second embodiment.

The image processing device 100 includes a generating unit 801, a determining unit 802, and an updating unit 803.

The generating unit 801 generates the difference data D based on the difference between the density of the region of the reference image and the density of the region of the print image using d0 as a substitute for d1. The generating unit 801 acquires information for determining whether or not there is a global density difference between the reference image and the print image.

The determining unit 802 determines whether or not there is a global density difference between the reference image and the print image based on the information acquired by the generating unit 801.

When the determining unit 802 determines that there is a global density difference, the updating unit 803 corrects the reference image.

Figure 9:
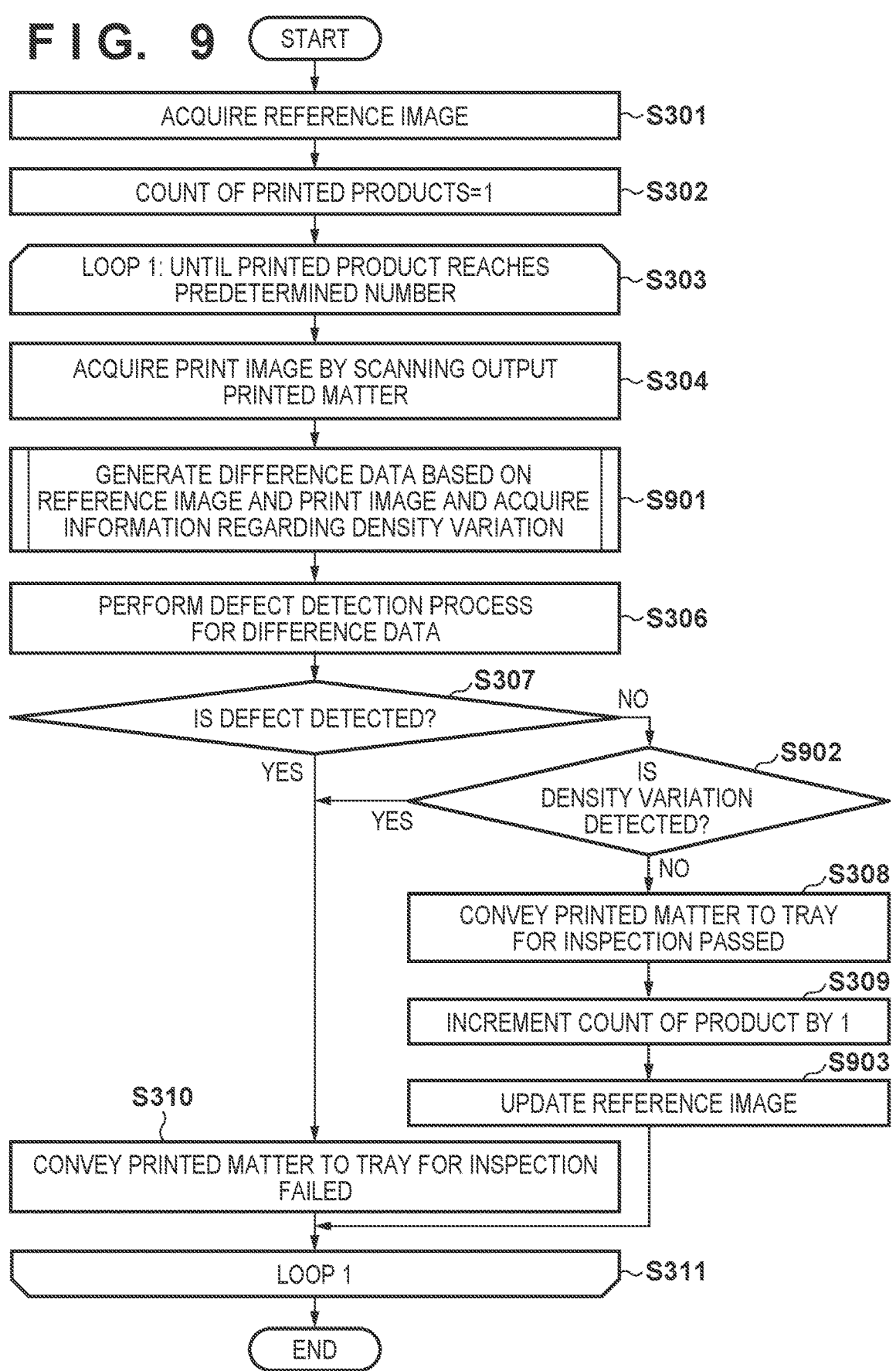
FIG. 9 is a flowchart illustrating an example of image processing according to the second embodiment.

FIG. 9 is a flowchart illustrating an example of image processing according to the second embodiment. In FIG. 9, S901 is performed instead of S305, and the processes of S902 and S903 are executed after S309. Note that description of the process similar to that of FIG. 3 is omitted.

In S901, the generating unit 801 generates the difference data D using d0 based on the difference between the reference image acquired in S301 and the print image acquired in S304. In addition, the generating unit 801 acquires information for determining whether a global density difference occurred between the reference image and the print image.

The determining unit 802 determines whether or not a global density difference occurred between the reference image and the print image based on the information acquired by the generating unit 801.

Figure 10:
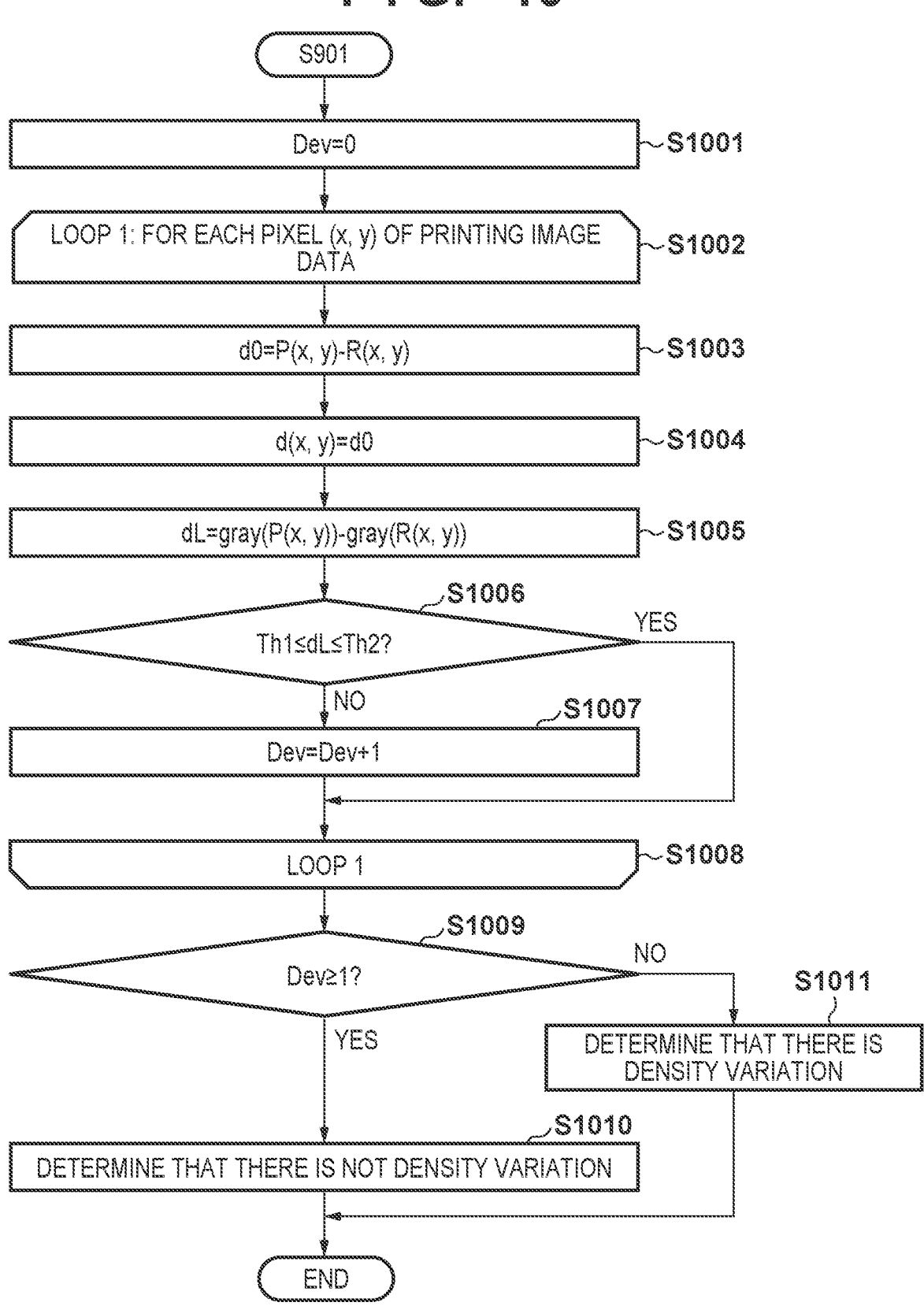
FIG. 10 is a flowchart for explaining a process for determining a global density difference according to the second embodiment.

FIG. 10 is a flowchart for explaining a process for determining a global density difference according to the second embodiment. The print image P and the reference image R are images of the same size and do not have positional deviation and rotational deviation at the time of scanning. Furthermore, the positions of the pixel (x, y) of the print image P, the pixel (x, y) of the reference image R, and the pixel (x, y) of the difference data D correspond to each other.

In S1001, the generating unit 801 initializes a variable Dev to 0. The variable Dev represents the number of pixels of the difference data in which the difference in pixel values of the print image and the reference image satisfies a predetermined condition. The variable Dev is assumed to be the number of pixels (regions) in which the difference in pixel values of the print image and the reference image is a value outside the predetermined range in grayscale conversion, but is not limited thereto.

In S1002, the generating unit 801 sets the pixel P (x, y) of the print image as the pixel of interest, and processes the processes in S1002 to S1008 for all the pixels of the print image.

In S1003, the generating unit 801 calculates d0 as a difference in pixel values between the pixel P (x, y) of the print image P and the pixel R (x, y) of the reference image R.

In S1004, the generating unit 801 determines the pixel value of the pixel (x, y) of the difference data D as the value of d0 calculated in S1003.

From S1005 to S1008, the generating unit 801 acquires information necessary for determining whether or not a global density difference occurred between the print image P and the reference image R.

In S1005, the generating unit 801 converts the pixel values of the pixel P (x, y) and the pixel R (x, y) into gray scale (one dimensional). Next, the generating unit 801 calculates a difference in pixel values of the gray-scaled pixel P (x, y) and the pixel R (x, y) as a variable dL. In FIG. 10, the calculation for grayscale is indicated by gray (P (x, y)) and gray (R (x, y)). The grayscale process (tone conversion process) of the pixel values can be performed by an arbitrary method.

For example, the generating unit 801 sets the values of the RGB channels in the pixel (x, y) to r (x, y), g (x, y), and b (x, y), respectively, and calculates gray (x, y) using the linear sum with the weight coefficient shown in (Equation 3). Here, gray (x, y) represents a pixel value after the grayscale processing.

$$\text{gray } (x, y) = 0.21 \times r(x, y) + 0.72 \times g(x, y) + 0.072 \times b(x, y) \quad \text{(Equation 3)}$$

In addition, the generating unit 801 calculates gray (x, y) from the color space of the image acquired by the reading unit 202 using a conversion function that converts luminance, brightness, or density into grayscale. Furthermore, the generating unit 801 may acquire a look-up table (LUT) that defines characteristics of the conversion function, and acquire gray (x, y) by LUT processing.

In S1006, the generating unit 801 uses the variable dL, and Th1 and Th2 as first and second threshold values defined in advance, respectively. The generating unit 801 determines whether or not dL is greater than or equal to Th1 and less than or equal to Th2 (greater than or equal to the first threshold value and less than or equal to the second threshold value ($0 \leq Th1 \leq Th2$)). When the generating unit 801 determines that dL is greater than or equal to Th1 and less than or equal to Th2 (Yes in S1006), the process proceeds to S1008. When the generating unit 801 determines that dL is not greater than or equal to Th1 and less than or equal to Th2 (No in S1006), the process proceeds to S1007.

In S1007, the generating unit 801 increments the value of the variable Dev by one, and the process proceeds to S1008.

In S1008, the generating unit 801 determines whether or not the processes of S1002 to S1007 have been performed for all the pixel positions of the print image P and the reference image R. When the generating unit 801 determines that the processes from S1002 to S1007 have been performed for all the pixel positions of the print image P and the reference image R (Yes in S1008), the process proceeds to S1009. When the generating unit 801 determines that the processes from S1002 to S1007 have not been performed for all the pixel positions of the print image P and the reference image R (No in S1008), the process returns to S1002.

In S1009, the determining unit 802 determines whether or not the value of the variable Dev is greater than or equal to one. When the determining unit 802 determines that the value of the variable Dev is greater than or equal to one (Yes in S1009), the process proceeds to S1010. When the determining unit 802 determines that the value of the variable Dev is not greater than or equal to one (No in S1009), the process proceeds to S1011.

In S1010, the determining unit 802 determines that there is no global density difference between the print image P and the reference image R, and the process proceeds to S306.

In S1011, the determining unit 802 determines that there is a global density difference between the print image P and the reference image R, and the process proceeds to S306.

In S306, the inspecting unit 206 detects a defective area of the print image based on the difference data D. Note that the difference data D is an image acquired using only d0. However, in the process of S306, similarly to the difference data D used in the first embodiment, a difference image data acquired using d1 and d0 may be used.

In S902, the updating unit 803 refers to the determination result of the density difference performed in S1009 to S1011, and determines whether or not a global density difference is detected between the print image P and the reference image R. When the updating unit 803 determines that a global density difference is detected between the print image P and the reference image R (Yes in S902), the process proceeds to S310. When the updating unit 803 determines that a global density difference is not detected between the print image P and the reference image R (No in S902), the process proceeds to S308.

In S903, the updating unit 803 updates (replaces) the reference data in the reference data holding unit 203 with the print image acquired in S304, and the process proceeds to S311.

In S311, the image processing device 100 returns the process to S303 and repeats the process for the next printed matter. In particular, when the reference image is updated in S903, the updated reference image is used as the reference image to be used in the next and subsequent processes.

According to the second embodiment, whether or not a global density difference occurred between a print image and a reference image is determined based on a difference in pixel values between the print image and the reference image and a predetermined threshold value, and the reference image is updated based on the determination result.

Example of Performing User Notification

It has been described that the printed matter is inspected while adaptively adjusting the density with respect to the allowable density variation that occurs in the print image by the temporal change in the print density. On the other hand, if the density variation of the print image is large, the inspection result of the printed matter is failure. In this case, there is a possibility that some kind of abnormality occurred in the output of the printing apparatus 190. Furthermore, there is a possibility that the printing apparatus 190 will continuously or frequently outputs a printed matter having a print failure. When the printing apparatus 190 in which some kind of abnormality has occurred in the output continues printing, this may lead to reduction in productivity, and thus the user needs to investigate the factor of the density variation of the printed matter.

Therefore, in a case where the detected density variation is larger than the predetermined threshold value, the image processing device 100 notifies (displays) the state of the printing apparatus 190 on, for example, the UI panel 108 as an external device. The user thereby determines whether or not to calibrate the printing apparatus 190 or whether or not to continue printing the printed matter using the printing apparatus 190. Furthermore, the image processing device 100 may temporarily stop the inspection process being executed when notifying the UI panel 108 of the state of the printing apparatus 190.

As described above, when a large density difference is detected from the print image, the occurrence of the printed matter including a print defect can be suppressed by promptly notifying the state of the printing apparatus to the user.

User Interface

Figures 11A, 11B:
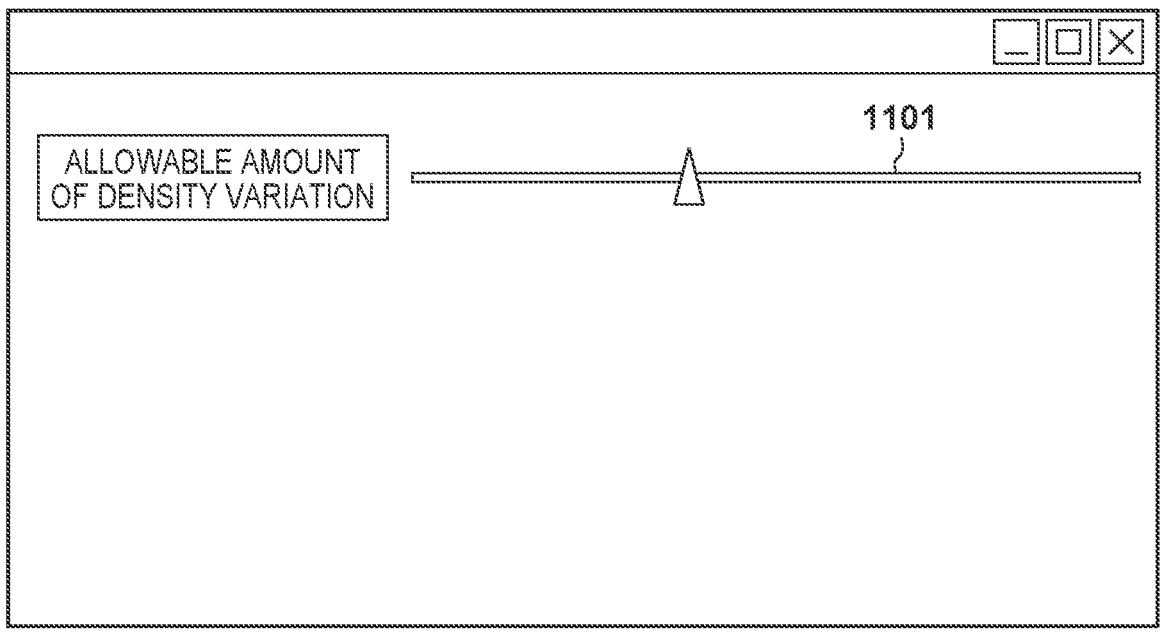
FIG. 11A is a diagram for explaining a user interface (UI).
FIG. 11B is a diagram for explaining a user interface (UI).

FIGS. 11A and 11B are diagrams for explaining a user interface (UI).

As shown in FIG. 11A, the user operates the slide bar 1101 to set an allowable amount (threshold value) for a global density difference (density variation) between the print image and the reference image.

As illustrated in FIG. 11B, three types of threshold values (threshold value 1102, threshold value 1103, threshold value 1104) are set in advance. The threshold value 1104 (illustrated as "small") is the smallest threshold value among the three types of threshold values. The threshold value 1103 (illustrated as "medium") is the medium threshold value among the three types of threshold values. The threshold value 1102 (illustrated as "large") is the largest threshold value among the three types of threshold values. The user can set an arbitrary threshold value by selecting any one of the threshold values 1102 to 1104 represented by radio buttons. In FIG. 11B, the threshold value 1103 is selected as the allowable amount of density variation. However, the user interface is not limited to the above, and may have a form in which the user can set a desired threshold value.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-081072, filed May 17, 2022, which is hereby incorporated by reference herein in its entirety.

What is claimed is:

1. An image processing device comprising:
at least one processor; and
at least one memory coupled to the at least one processor, the memory storing instructions that, when executed by the processor, cause the processor to act as a plurality of units comprising:
(1) a correcting unit configured to (a) calculate a first difference between (i) a density of a partial region in a print image obtained by scanning a printed matter to be inspected and (ii) a density of a region corresponding to the partial region in a reference image, (b) calculate a second difference between (i) a density of a region including the partial region in the print image and (ii) a density of a region corresponding to the region including the partial region in the reference image, (c) correct the first difference using the second difference in a case where the second difference is smaller than a first threshold value for a correction amount of density variation, and (d) correct the first difference using the first threshold value in a case where the second difference is not smaller than the first threshold value; and
(2) an inspecting unit configured to inspect the print image based on the corrected first difference.

2. The image processing device according to claim 1, wherein the inspecting unit determines whether or not a defective region is included in the print image based on whether or not the corrected first difference exceeds a second threshold value.

3. The image processing device according to claim 1, wherein the correcting unit selects the first difference or the corrected first difference based on a comparison between the first difference and the corrected first difference, and
wherein the inspecting unit inspects the print image based on the selected one of the first difference and the corrected first difference.

4. The image processing device according to claim 1, wherein the inspecting unit determines whether or not a printed matter to be inspected satisfies an inspection standard based on whether or not the second difference exceeds a third threshold value.

5. The image processing device according to claim 1, wherein the correcting unit replaces the reference image with the print image when a number of partial regions in which a third difference, between a density of the partial region in a tone-converted print image and a density of the region corresponding to the partial region in a tone-converted reference image, does not satisfy being greater than or equal to a fourth threshold value and less than or equal to a fifth threshold value, is greater than or equal to a sixth threshold value.

6. The image processing device according to claim 1, wherein the first difference is a smallest difference among differences between the density of the partial region in the print image and the density of each partial region in the vicinity of a region corresponding to the partial region of the print image in the reference image.

7. The image processing device according to claim 3, wherein the correcting unit corrects the first difference or the corrected first difference with a weight for adjusting the difference.

8. The image processing device according to claim 4, wherein the plurality of units further comprises a display control unit configured to display a user interface for setting the first threshold value.

9. The image processing device according to claim 4, wherein the plurality of units further comprises a notifying unit configured to notify an external device of a state of a printing apparatus configured to print the printed matter based on whether or not the second difference exceeds a threshold value.

10. The image processing device according to claim 1, wherein the plurality of units further comprises:
an acquiring unit configured to acquire the reference image and the print image; and
a calculating unit configured to calculate a density of a region including the partial region in the print image and a density of a region corresponding to the region including the partial region of the print image in the reference image.

11. The image processing device according to claim 1, wherein the second difference is a statistical value of at least one of a least square error of RGB values, a difference of luminance values, and a color difference of Lab values in the region.

12. A printing system comprising:
a server configured to generate a print job for a printing apparatus;
a printing apparatus configured to print a printed matter based on the print job; and a reading device configured to scan the printed matter; and the image processing device according to claim 1.

13. An image processing method comprising:

calculating a first difference between a density of a partial region in a print image obtained by scanning a printed matter to be inspected and a density of a region corresponding to the partial region in a reference image;

calculating a second difference between a density of a region including the partial region in the print image and a density of a region corresponding to the region including the partial region in the reference image;

correcting the first difference using the second difference in a case where the second difference is smaller than a first threshold value for a correction amount of density variation;

correcting the first difference using the first threshold value in a case where the second difference is not smaller than the first threshold value; and inspecting the print image based on the corrected first difference.

14. A non-transitory computer-readable storage medium storing instructions that, when executed by a computer, cause the computer to perform an image processing method comprising:

calculating a first difference between a density of a partial region in a print image obtained by scanning a printed matter to be inspected and a density of a region corresponding to the partial region in a reference image;

calculating a second difference between a density of a region including the partial region in the print image and a density of a region corresponding to the region including the partial region in the reference image;

correcting the first difference using the second difference in a case where the second difference is smaller than a first threshold value for a correction amount of density variation;

correcting the first difference using the first threshold value in a case where the second difference is not smaller than the first threshold value; and inspecting the print image based on the corrected first difference.

* * * * *